United States Patent
Vidlak et al.

(10) Patent No.: US 12,308,767 B2
(45) Date of Patent: May 20, 2025

(54) FIELD ORIENTED CONTROL OF PERMANENT MAGNET SYNCHRONOUS MOTOR WITH CONSTANT POWER FACTOR CONTROL LOOP

(71) Applicant: NXP USA, Inc., Austin, TX (US)

(72) Inventors: Michal Vidlak, Martin (SK); Lukas Gorel, Povazska Bystrica (SK); Tomas Kulig, Horni Bludovice (SK)

(73) Assignee: NXP USA, Inc., Austin, TX (US)

( * ) Notice: Subject to any disclaimer, the term of this patent is extended or adjusted under 35 U.S.C. 154(b) by 147 days.

(21) Appl. No.: 18/122,466

(22) Filed: Mar. 16, 2023

(65) Prior Publication Data

US 2024/0313679 A1 Sep. 19, 2024

(51) Int. Cl.
*H02P 21/18* (2016.01)
*H02P 21/00* (2016.01)
*H02P 21/22* (2016.01)

(52) U.S. Cl.
CPC .......... *H02P 21/0007* (2013.01); *H02P 21/18* (2016.02); *H02P 21/22* (2016.02); *H02P 2207/05* (2013.01)

(58) Field of Classification Search
CPC ...... H02P 21/0007; H02P 21/18; H02P 21/22; H02P 2207/05
See application file for complete search history.

(56) References Cited

U.S. PATENT DOCUMENTS

| 7,075,264 B2 * | 7/2006 | Huggett | H02P 21/18 318/700 |
| 7,629,764 B2 * | 12/2009 | Shoemaker | G05B 13/042 318/632 |

(Continued)

FOREIGN PATENT DOCUMENTS

| CN | 103701375 A | 4/2014 |
| DE | 102014205244 A1 | 1/2015 |

OTHER PUBLICATIONS

Vidlak et al.: "Performance evaluation, analysis, and comparison of the back-EMF-based sensorless FOC and stable V/f control for PMSM," 2022 International Symposium on Power Electronics, Electrical Drives, Automation and Motion, Jun. 22, 2022, pp. 318-323.

(Continued)

*Primary Examiner* — Rina I Duda

(57) ABSTRACT

A method for Field Oriented Control (FOC) of a Permanent Magnet Synchronous Motor (PMSM) with a constant Power Factor Control (PFC) Loop includes measuring a rotor position of the PMSM. A plurality of stator voltages of the PMSM is controlled with a required direct (d)-axis current, a required quadrature (q)-axis current, the rotor position and a plurality of measured stator currents of the PMSM in a three-phase stationary reference frame. The required d-axis current is determined with a required power factor, the plurality of measured stator currents transformed into two-phase stationary reference frame, the measured stator currents transformed into a rotational reference frame, and each of a required α-axis voltage and a required β-axis voltage transformed into the two-phase stationary reference frame, wherein a power factor of the PMSM is controlled to be equal to the required power factor.

19 Claims, 6 Drawing Sheets

(56) References Cited

U.S. PATENT DOCUMENTS

| | | | |
|---|---|---|---|
| 9,496,817 B1* | 11/2016 | Lepka | H02P 29/67 |
| 9,634,593 B2* | 4/2017 | Marcinkiewicz | H02P 6/12 |
| 9,954,433 B2* | 4/2018 | Venturini | H02P 27/06 |
| 10,103,670 B2 | 10/2018 | Song et al. | |
| 2005/0218862 A1* | 10/2005 | Huggett | H02P 21/26 |
| | | | 318/722 |
| 2017/0126153 A1* | 5/2017 | Lepka | H02P 6/12 |
| 2019/0229664 A1* | 7/2019 | Kobayashi | H02P 21/22 |
| 2022/0190762 A1 | 6/2022 | Liu et al. | |
| 2022/0368255 A1 | 11/2022 | Takahashi et al. | |

OTHER PUBLICATIONS

Andreescu et al., "Stable V/f Control System with Unity Power Factor for PMSM Drives," IEEE, 2012 13th International Conference on Optimization of Electrical and Electronic Equipment (OPTIM), May 24-26, 2012, pp. 432-438; 7 pages.

* cited by examiner

FIELD ORIENTED CONTROL OF PERMANENT MAGNET SYNCHRONOUS MOTOR WITH CONSTANT POWER FACTOR CONTROL LOOP

FIELD

This disclosure relates generally to Field Oriented Control (FOC) of a Permanent Magnet Synchronous Motor (PMSM), and more specifically to FOC of a PMSM while maintaining a constant Power Factor (PF) control independent of motor parameter variations.

BACKGROUND

A PMSM is a rotating electrical machine with stator phase windings encircling a rotor with permanent magnets. While conventional Direct Current (DC) motors may use mechanical commutators, a PMSM uses vector control techniques to independently control flux and torque-producing currents, which are orthogonal to each other. Specifically, FOC includes a three-phase stationary reference frame (also referred to as a stator reference frame or as "abc" coordinates), referenced to the stator of the motor. The FOC further includes a two-phase stationary reference frame (also referred to as an orthogonal reference frame), which is also stationary but with "αβ" components perpendicular to each other. The three-phase stationary reference frame may be converted to the two-phase stationary reference frame with a Clarke transformation. Conversely, the two-phase stationary reference frame may be converted to the three-phase stationary reference frame with an inverse Clarke transformation. The FOC further includes a rotational reference frame (also referred to as a rotor or rotating frame), which rotates at the motor speed, and includes DC components "dq". The two-phase stationary reference frame may be converted to the rotational reference frame with a Park transformation and a transformation angle input. Conversely, the rotational reference frame may be converted to the two-phase stationary reference frame with an inverse Park transformation and the transformation angle. Implementation of the Clarke, Inverse Clark, Park and Inverse Park transformations are known in the art and are omitted here for brevity.

The efficiency of a PMSM may be further improved with Power Factor Control (PFC). PF is a measure of how efficiently incoming power is used by the PMSM, and is the ratio of active to apparent power, where the apparent power is a vector sum of the active and reactive power. Conventional methods for controlling PF of a PMSM have relied upon motor parameters, which vary with operating conditions, hence a need exists to provide constant PF control independent of motor parameter variations and dependencies.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for FOC control of a PMSM to achieve a constant PFC independent of motor parameter variations. FOC control is achieved by controlling a required direct (d)-axis current to control a flux of the PMSM, while a required quadrature (q)-axis defines a required torque (or indirectly a required rotor speed) of the PMSM. The PFC is maintained in a voltage vector reference frame where the appropriate control of the d-axis current can satisfy such condition. By controlling the power factor to certain values, the control performance of the PMSM can be improved. Furthermore, the proposed structure is independent of the motor parameters. These machine parameters may vary under different operational conditions causing a non-optimal shift of the motor operating point leading to degraded control performance. Hence, the PFC loop independent of motor parameters, such as stator resistance, d-axis and q-axis inductance, permanent magnet flux linkage and the variation of these parameters with respect to temperature, magnetic core saturation, skin-effect and the like, provides a significant benefit. Furthermore the required power factor cos φ* may be varied over the entire speed range of the PMSM to optimize operating efficiency.

In one embodiment, the PF is maintained close to unity, thereby leading to lower apparent power. With the higher power factor, the requirement for the apparent power is smaller than for control with lower power factor. Hence, a voltage source inverter with lower apparent power can be used to control the motor. Moreover, for specific PMSM machine constructions, depending on the motor inductances and permanent magnet flux linkage, controlling the power factor to a constant can satisfy the control performance of a Maximum Torque Per Ampere (MTPA) control strategy, which improves motor efficiency by minimizing Joule losses. In another embodiment, the required power factor may be varied by a user or from a look-up-table in response to different operating points (e.g., loading) of the PMSM, motor construction and electrical parameters supplied by the PMSM manufacturer.

Figure 1:
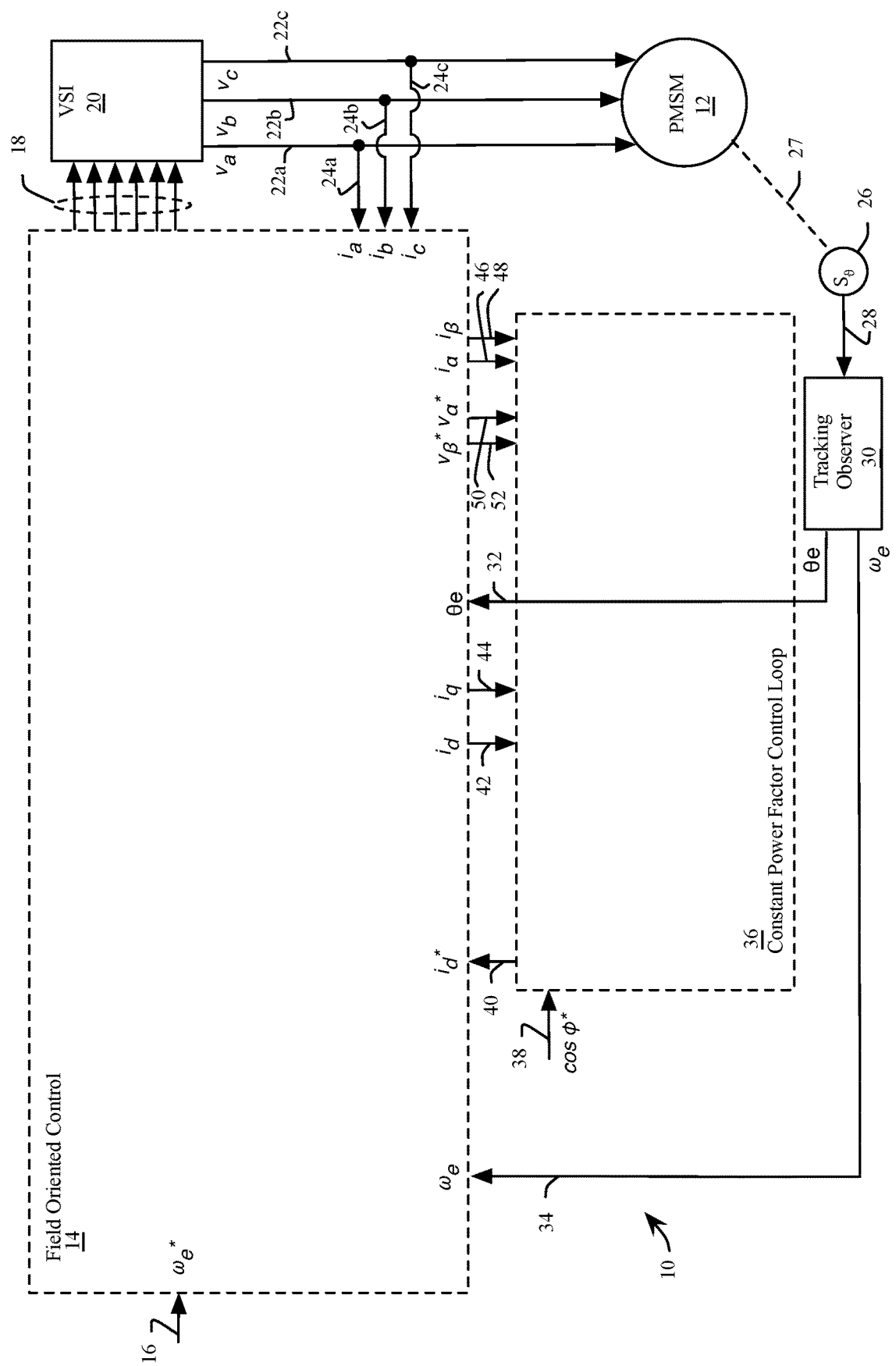
FIG. 1 is a schematic view of FOC of a PMSM with a constant PFC loop, in accordance with an embodiment of the present disclosure.

FIG. 1 shows an example embodiment 10 of a PMSM 12 controlled by an FOC 14. The FOC 14 is configured to receive a required rotor speed ωe* 16 to provide a plurality of Pulse Width Modulation (PWM) channels 18 to a Voltage Source Inverter (VSI) 20. In one embodiment, the VSI 20 includes a three-phase full bridge. The embodiment 10 is based upon a three phase PMSM 12, although other embodiments may be extended to include a PMSM 12 having more than three phases without limitation. The VSI 20 generates a plurality of stator voltages 22a, 22b and 22c (generally 22) for respective stator windings (not shown) of the PMSM 12, in response to the PWM channels 18. A plurality of armature currents 24a, 24b and 24c (generally 24) are measured on the outputs of the VSI 20. The FOC 14 is used to control the torque and flux of the PMSM 12 to achieve high dynamic performance. A sensor 26 (e.g., a resolver, an encoder or a hall effect sensor), may be coupled to the PMSM 12 over a mechanical or magnetic path 27 to sense rotation of the PMSM 12 and to communicate over a net 28 to a tracking observer 30. The tracking observer 30 may generate a rotor position δe 32 and a measured rotor speed ωe 34 from data received by the sensor 26.

A constant PFC loop 36 responds to a required power factor cos φ* 38 to generate a required d-axis current id* 40, thereby controlling a power factor of the PMSM 12. Generating the required d-axis current 40 further requires the constant PFC loop 36 to respond to a measured d-axis current id 42, a measured q-axis current iq 44, a d-axis error suppressed by PI controller to zero to provide the required d-axis voltage transformed into a two-phase stationary reference frame to form a required voltage in α-axis vα* 50 and a q-axis error suppressed by PI controller to zero to provide the required q-axis voltage transformed into a two-phase stationary reference frame to form a required voltage in β axis vβ* 52, and a pair of currents iα 46 and iβ 48. In one embodiment, the d-axis error is determined by subtracting the measured d-axis current 42 from the required d-axis current 40 and the q-axis error is determined by subtracting the measured q-axis current 44 from the required q-axis current (derived from the required rotor speed 16 and measured rotor speed ωe 34). In one embodiment, the pair of currents iα 46 and iβ 48 is determined from the measured armature currents 24 transformed into the two-phase stationary reference frame with a Clarke transformation.

Figure 2:
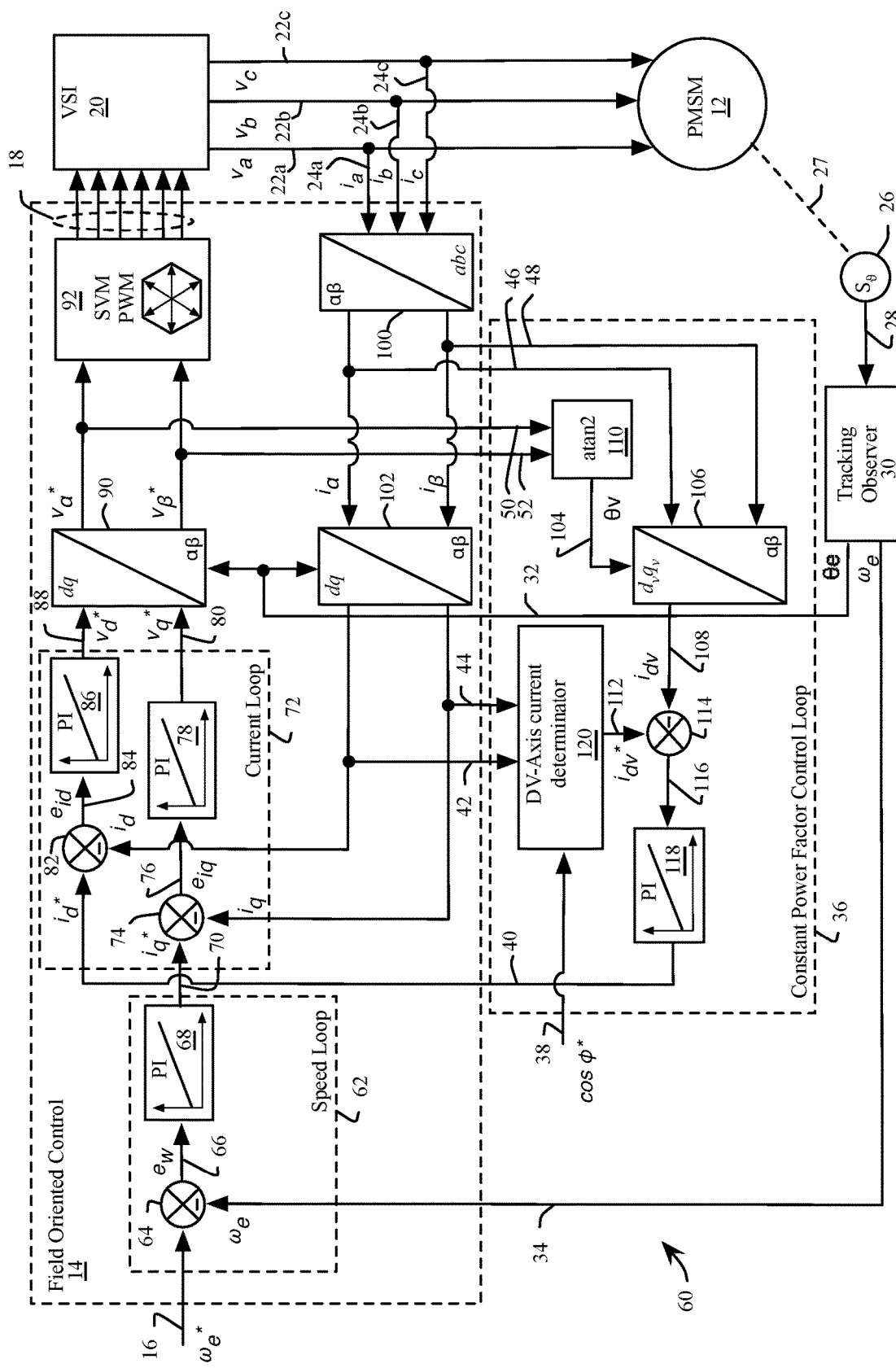
FIG. 2 is another schematic view of FOC of a PMSM with a constant PFC loop, in accordance with an embodiment of the present disclosure.

FIG. 2 shows another example embodiment 60 of the PMSM 12 controlled by the FOC 14. With continued reference to FIG. 1, FIG. 2 further describes an example implementation of the FOC 14 and the constant PFC loop 36. In various embodiments, one or more of the functions used by the FOC 14 and PFC loop 36 may be implemented solely or with a combination of hardware circuitry, software or firmware. In one embodiment, the FOC 14 comprises a speed loop 62 to provide fast and accurate speed control of the PMSM 12 in response to the required rotor speed input 16. The speed loop 62 a subtractor 64 generates a rotor speed error 66 by subtracting the measured rotor speed 34 from the required rotor speed 16. A Proportional Integral (PI) controller 68 may be used to provide a required q-axis current 70, which is proportional to both the rotor speed error 66 and its integral. PI controllers improve stability by providing a first-order filtering function controllable by a proportional gain Kp and an integration gain Ki. PI controllers also are required to suppress the created errors (e.g. ew 66) to zero. Accordingly, the output of the PI controllers after suppressing the created error to zero is an action variable used to control the next stage. In another embodiment, the required q-axis current 70 may be provided directly to the embodiment 60 to control a torque of the PMSM 12 rather than its rotor speed, thereby eliminating the speed loop 62.

From a control system perspective, the current loop 72 resides inside of the speed loop 62 and controls the d-axis and q-axis currents. Specifically, a subtractor 74 generates a q-axis error 76 by subtracting the measured q-axis current 44 from the required q-axis current 70. A PI controller 78 may be used to provide a filtered q-axis error Vq* 80 and to suppress the created error eiq 76 to zero. A subtractor 82 generates a d-axis error 84 by subtracting the measured d-axis current 42 from the required d-axis current 40. A PI controller 86 may be used to provide a filtered d-axis error Vd* 88 and to suppress the created error eid 84 to zero.

An Inverse Park transformation 90 transforms the required d-axis voltage 88 and the required q-axis voltage 80 from the rotational reference frame dq into the two-phase stationary reference frame αβ with electrical rotor position θe 32 to generate the required voltage in α-axis vα* 50 and the required voltage in β-axis vβ* 52. A Space Vector Modulator (SVM) PWM 92 converts the required voltage in α-axis Vα* 50 and the required voltage in β-axis Vβ* 52 into a plurality of PWM channels 18 in the three-phase stationary reference frame for controlling the VSI 20. In one embodiment, the SVM PWM 92 generates three sets of high-side and low-side PWM signals separated by 120 degrees, the details of which are known in the art and omitted here for brevity. The plurality of stator currents 24 are converted from the three-phase stationary reference frame into the two-phase stationary reference frame with a Clarke transformation 100 to form the pair of currents comprising the measured α-axis current iα 46 and the measured β-axis current iβ 48. The measured α-axis current iα 46 and the measured β-axis current iβ 48 are transformed with the electrical rotor position 32 into the rotational reference frame with Park transformation 102 to generate the measured d-axis current id 42 and the measured q-axis current iq 44.

The constant PFC loop 36 generates the required d-axis current 40 to control the power factor of the PMSM 12 to track the required power factor 38 input. The PFC loop 36 further utilizes the measured d-axis current 42, the measured q-axis current 44, the required voltage in α-axis Vα* 50 and the required voltage in β-axis Vβ* 52 and the measured α-axis current iα 46 and the measured β-axis current iβ 48. A voltage vector position θv 104 is generated in accordance with the formula θv=atan 2(Vβ*, Vβ*), specifically by an atan 2 function 110 of the required voltage in β-axis Vβ* 52 divided by the required voltage in α-axis Vα* 50. The measured α-axis current 46 and the measured β-axis current 48 are transformed with the voltage vector position 104 into the rotational reference frame by means of Park transformation 106 to generate a measured direct voltage (dv)-axis current 108 in a voltage vector reference frame, (which may also be referred to as a dvqv reference frame). In the dvqv reference frame, a phase shift between the stator voltage vector and the stator current vector can be controlled. In one embodiment, the atan 2 function 110 used to generate the voltage vector position 104 is implemented with a programmed microcontroller unit although this disclosure is not limited thereto.

The measured dv-axis current 108 is subtracted from a required dv-axis current 112 using a subtractor 114 to generate a dv-axis error 116. The dv-axis error is further suppressed to zero by a PI controller 118 to generate the required d-axis current 40. The PI controller 118 acts as a first-order filter with proportional gain Kp and integration gain Ki. In one embodiment, the gains of the PI controller in the voltage vector reference frame dvqv can be set up close to the d-axis time constant τd=Ld/Rs of the PMSM 12, where Ld is the d-axis inductance, and Rs is the stator resistance. The bandwidth of the PI controller 118 in the constant PFC loop 36 influences the dynamics of the required d-axis current id* 40, which is entering the current loop in the FOC 14.

Figure 3:
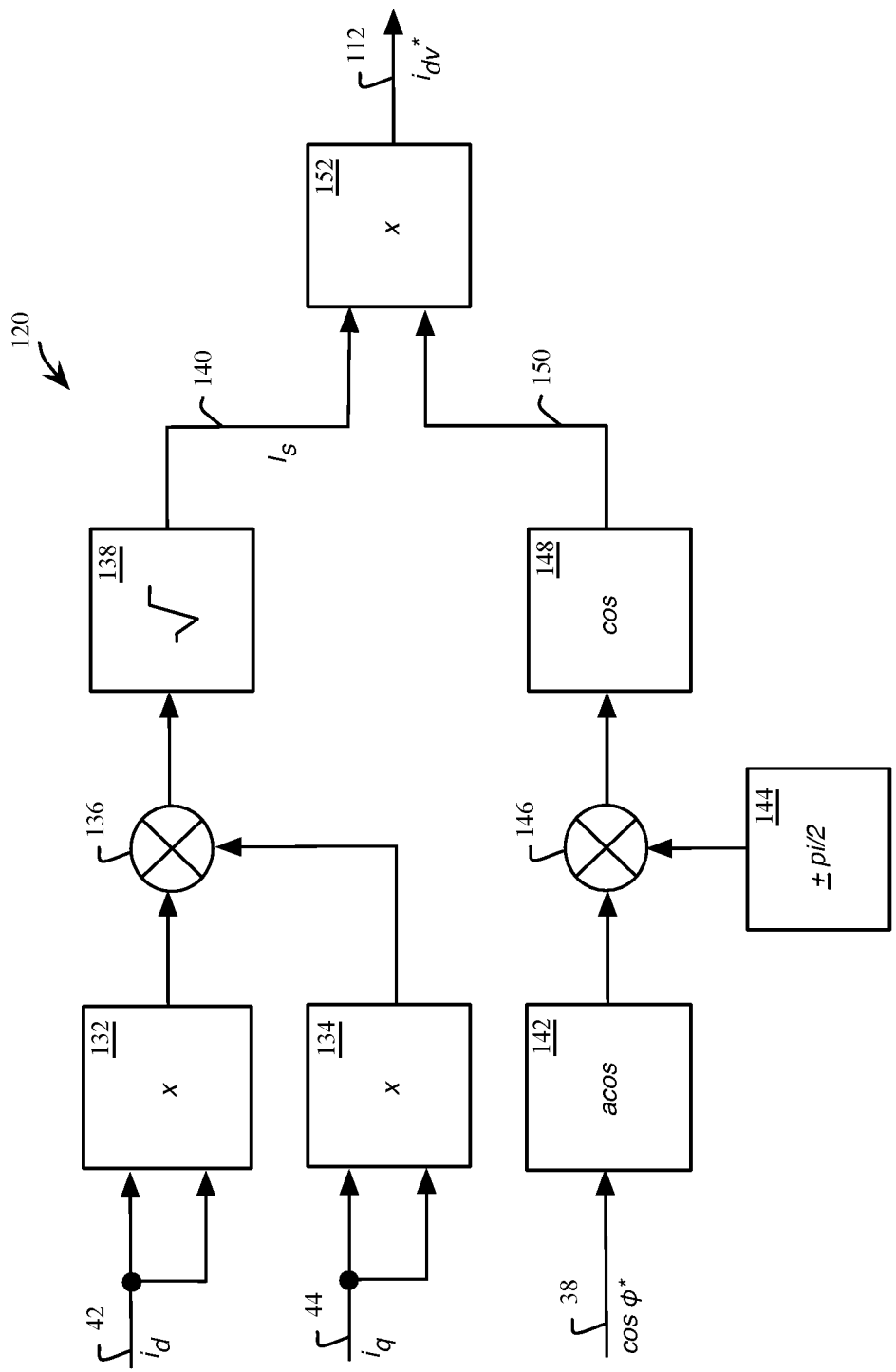
FIG. 3 is a schematic view of the direct voltage (dv)-axis current determinator of FIG. 1 and FIG. 2, in accordance with an embodiment of the present disclosure

In one embodiment, the required dv-axis current 112 is generated with a dv-axis current determinator 120, in response to the required power factor 38, the measured d-axis current 42 and the measured q-axis current 44. With continued reference to FIG. 2, FIG. 3 shows further details of an embodiment of the dv-axis current determinator 120, wherein the measured d-axis current id42 is squared with a multiplier 132, the measured q-axis current iq44 is squared with a multiplier 134, the outputs of the multipliers 132 and 134 are summated with an adder 136, then a square root of the output of the adder 136 is generated with a square root function 138 to generate a stator current Is 140, in accordance with the equation Is=sqrt (id$^2$+iq$^2$).

The required power factor 38 is converted to phase shift in radians with an arccosine function 142, shifted with a phase shifter 144 and an adder 146, then converted back to the power factor with a cosine function 148 to generate a phase shifted power factor 150. The stator current 140 and the phase shifted power factor 150 are multiplied with a multiplier 152 to generate the required dv-axis current idv* 112. In FIG. 3, the phase shift between voltage and current φ has to be shifted by +−pi/2 to provide precise constant power factor control. A shift by positive pi/2 in the phase shifter 144 means that the motor power factor is controlled to be a capacitive type. A shift by negative pi/2 in the phase shifter 144 means that the motor power factor is controlled to be an inductive type (motor control applications). The term "pi" as used herein is the mathematical constant defined by a ratio of a circle's circumference to its diameter (e.g., beginning with the numerical sequence 3.14159).

Figure 4:
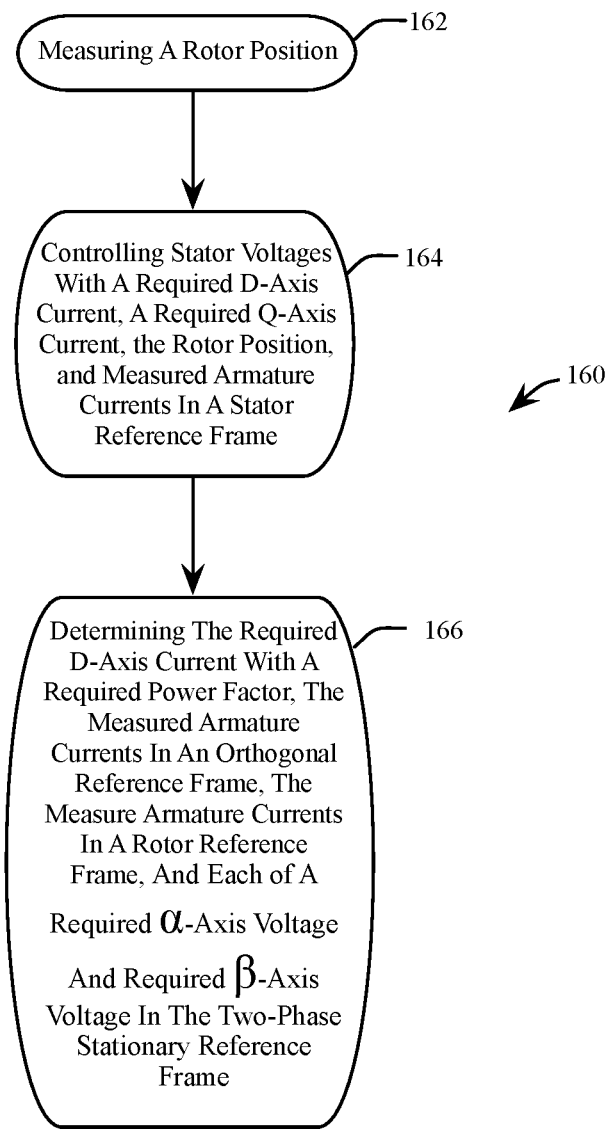
FIG. 4 is a flowchart representation of a method for FOC of a PMSM with a constant PFC loop, in accordance with an embodiment of the present disclosure.

FIG. 4 shows an embodiment 160 of a method for FOC of a PMSM with a constant PFC loop. With continued reference to FIG. 1 and FIG. 4, at 162 a rotor position 32 is measured. At 164, a plurality of stator voltages 22 are controlled with a required d-axis current 40, a required q-axis current 70, the rotor position 32 and measured stator currents in a three-phase stationary reference frame 24. At 166, the required d-axis current 40 is determined with a required power factor 38, the measured armature currents in a two-phase stationary reference frame (46; 48), the measured armature currents in a rotational reference frame (42; 44) and each of a required α-axis voltage and required β-axis voltage in the two-phase stationary reference frame (50 and 52 respectively).

Figure 5:
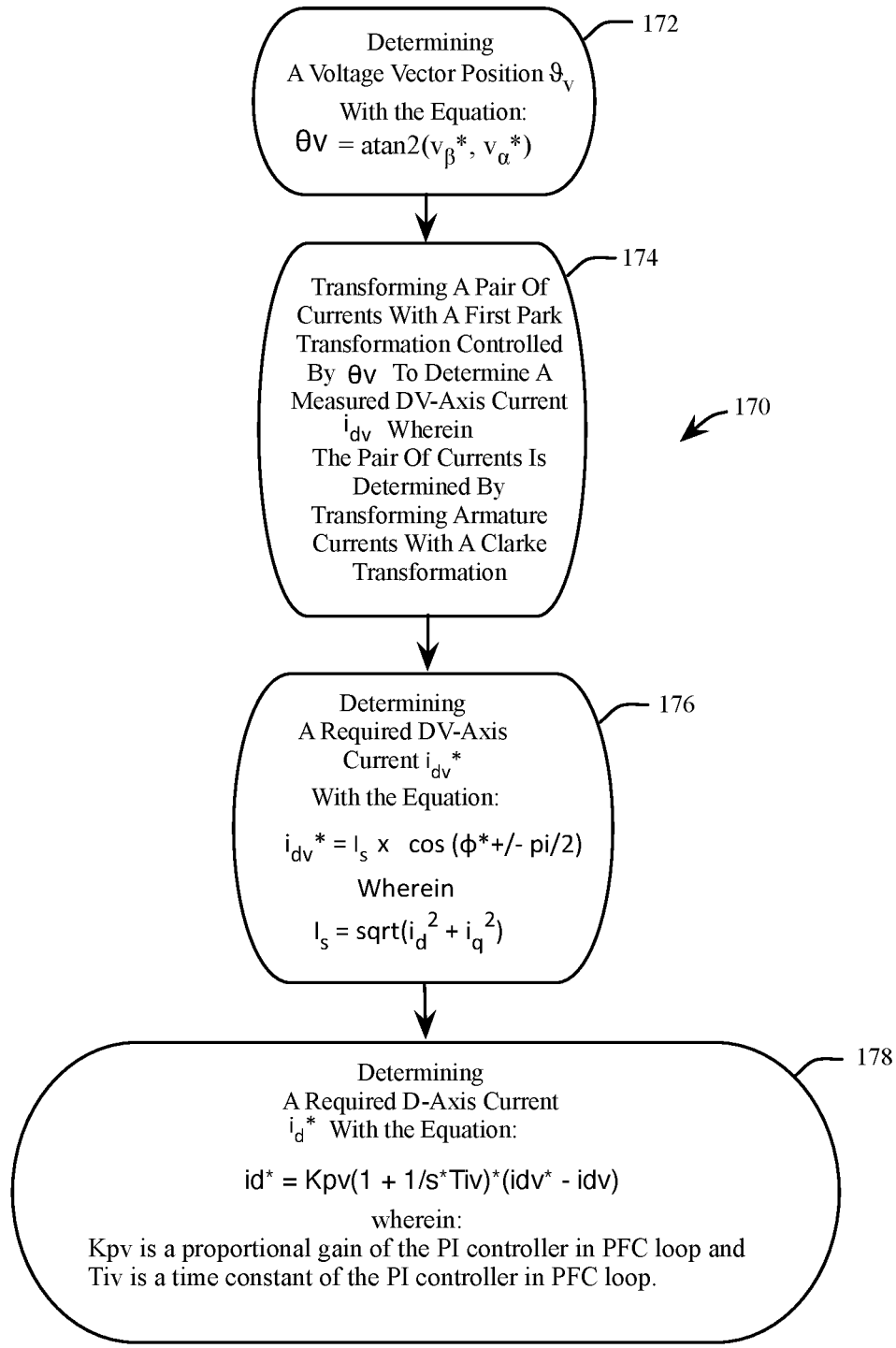
FIG. 5 is a flowchart representation of another method for FOC of a PMSM with a constant PFC loop, in accordance with an embodiment of the present disclosure.

FIG. 5 shows an embodiment 170 of a method for FOC of a PMSM with a constant PFC loop. With continued reference to FIG. 2 and FIG. 5, at 172 a voltage vector position 104 is determined. At 174, a pair of currents (46; 48) are transformed with the voltage vector position 104 by means of first Park transformation 106 to determine a measured dv-axis current 108, wherein the pair of currents (46; 48) is determined by transforming armature currents 24 with a Clarke transformation 100. At 176, a required dv-axis current 112 is determined. At 178, a required d-axis current 40 is determined by suppressing the error between the measured dv-axis current 108 and the required dv-axis current 112 with a PI controller 118.

Figure 6:
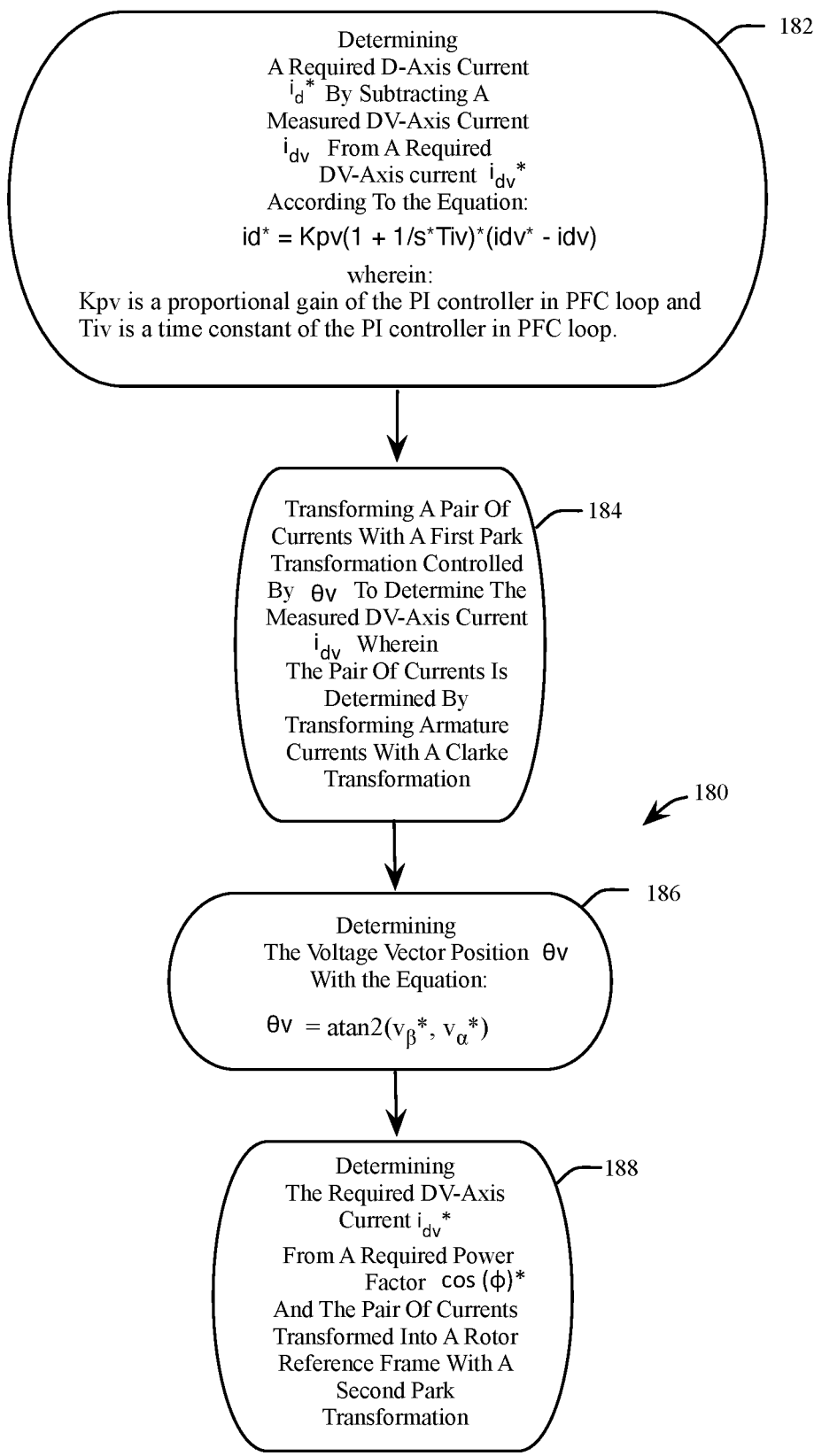
FIG. 6 is a flowchart representation of a method for FOC of a motor with a constant PFC loop, in accordance with an embodiment of the present disclosure.

FIG. 6 shows an embodiment 180 of a method for FOC of a motor with a constant PFC loop. With continued reference to FIG. 2 and FIG. 6, at 182 a required d-axis current 40 is determined. At 184, a pair of currents (46; 48) are transformed with the voltage vector position 104 by means of first Park transformation 106 to determine the measured dv-axis current 108. At 186, the voltage vector position 104 is determined. At 188, the required dv-axis current 112 is determined from a required power factor 38 and the pair of currents transformed into a rotational reference frame (42; 44) with a second Park transformation 102.

As will be appreciated, at least some of the embodiments as disclosed include at least the following. In one embodiment, a method for Field Oriented Control (FOC) of a Permanent Magnet Synchronous Motor (PMSM) with a constant Power Factor Control (PFC) Loop comprises measuring a rotor position of the PMSM. A plurality of stator voltages of the PMSM are controlled with a required direct (d)-axis current, a required quadrature (q)-axis current, the rotor position and a plurality of measured stator currents of the PMSM in a three-phase stationary reference frame. The required d-axis current is determined with a required power factor, the plurality of measured stator currents transformed into a two-phase stationary reference frame, the measured stator currents transformed into a rotational reference frame to generate a measured d-axis current and a measured q-axis current, and each of a required d-axis voltage and a required q-axis voltage transformed into the two-phase stationary reference frame, wherein the required d-axis voltage is determined with a d-axis PI controller configured to suppress to a zero value a d-axis error between the required d-axis current and a measured d-axis current and the required q-axis voltage is determined with a q-axis PI controller configured to suppress to the zero value a q-axis error between the required q-axis current and a measured q-axis current, and wherein a power factor of the PMSM is controlled to be equal to the required power factor.

Alternative embodiments of the method for Field Oriented Control (FOC) of a Permanent Magnet Synchronous Motor (PMSM) with a constant Power Factor Control (PFC) Loop include one of the following features, or any combination thereof. The required q-axis current is generated from a speed error, wherein the speed error is determined by subtracting a measured rotor speed of the PMSM from a required rotor speed. The required d-axis current is determined with a dv-axis PI controller configured to suppress to the zero value a dv-axis error between a required dv-axis current and a measured dv-axis current. Adjusting a gain of the dv-axis PI controller is determined by a d-axis inductance and a stator resistance of the PMSM. The measured stator currents are transformed into the two-stage stationary reference frame with a Clarke transformation, the measured stator currents are transformed into the rotational reference frame with the rotor position through a first Park transformation, and each of the required d-axis voltage and the required q-axis voltage are transformed into the two-phase stationary reference frame with the rotor position through an Inverse Park transformation. Determining the required d-axis current further comprises determining a voltage vector position from an atan 2 function of the required β-axis voltage divided by the required α-axis voltage. Determining the required d-axis current further comprises determining a measured direct voltage (dv)-axis current in a voltage vector reference frame by transforming the measured stator currents in the two-phase stationary reference frame with the voltage vector position through a second Park transformation. Determining the required d-axis current further comprises suppressing to the zero value a dv-axis error between the measured dv-axis current in the voltage vector reference frame from a required dv-axis current in the voltage vector reference frame with a dv-axis PI controller. Determining the required dv-axis current in the voltage vector reference frame further comprises multiplying a stator current of the PMSM with the required power factor phase shifted by positive pi/2, wherein the stator current is determined from a square root of a sum of a square of each of the measured d-axis current and the measure q-axis current. Determining the required dv-axis current in the voltage vector reference frame further comprises multiplying a stator current of the PMSM with the required power factor phase shifted by negative pi/2, wherein the stator current is determined from a square root of a sum of a square of each of the measured d-axis current and the measure q-axis current.

In another embodiment, a method for Field Oriented Control (FOC) of a Permanent Magnet Synchronous Motor (PMSM) with a constant Power Factor Control (PFC) Loop comprises determining a voltage vector position from an atan 2 function of a required β-axis voltage transformed into a two-phase stationary reference frame divided by a required α-axis voltage transformed into the two-phase stationary reference frame, wherein the required β-axis voltage is determined by an Inverse Park transformation of a required q-axis voltage with an electrical rotor position and the required α-axis voltage is determined by the Inverse Park transformation of a required d-axis voltage with the electrical rotor position, wherein the required q-axis voltage is determined by a q-axis PI controller configured to suppress to a zero value a q-axis error between a required q-axis current and a measured q-axis current and the required d-axis voltage is determined by a d-axis PI controller configured to suppress to the zero value a d-axis error between a required d-axis current and a measured d-axis current. A pair of currents in the two-phase stationary reference frame are transformed with the voltage vector position with a first Park transformation to determine a measured direct voltage (dv)-axis current in a voltage vector reference frame, wherein the pair of currents in the two-phase stationary reference frame is determined by transforming a plurality of stator currents of the PMSM with a Clarke transformation. Determining a required dv-axis current in the voltage vector reference frame comprises multiplying a stator current of the PMSM with a required power factor phase shifted by a phase shift, wherein the stator current is determined from a square root of a sum of a square of each of the measured d-axis current and the measured q-axis current, wherein the measured d-axis current and the measure q-axis current are generated by transforming the pair of currents in the two-phase stationary reference frame into a rotational reference frame with the electrical rotor position of PMSM using a second Park transformation. The required d-axis current is determined by a dv-axis PI controller suppressing to the zero value a dv-axis error between the measured dv-axis current in the voltage vector reference frame and the required dv-axis current in the voltage vector reference frame.

Alternative embodiments of the method for Field Oriented Control (FOC) of a Permanent Magnet Synchronous Motor (PMSM) with a constant Power Factor Control (PFC) Loop include one of the following features, or any combination thereof. The required q-axis current is generated from a speed error, wherein the speed error is determined by subtracting the measured rotor speed of the PMSM from a required rotor speed. Adjusting a gain of the dv-axis PI controller is determined by a d-axis inductance and a stator resistance of the PMSM. The phase shift is positive pi/2. The phase shift is negative pi/2.

In another embodiment, a method for Field Oriented Control (FOC) of a motor with a constant Power Factor Control (PFC) Loop comprises using a dv-axis PI controller to suppress to a zero value a dv-axis error between a measured dv-axis current in a voltage vector reference frame and a required dv-axis current in the voltage vector reference frame to determine a required d-axis current, wherein the required d-axis current controls a plurality of stator voltages of the motor to achieve a power factor defined by a required power factor, and wherein: the measured dv-axis current in the voltage vector reference frame is determined by transforming a pair of currents in a two-phase stationary reference frame with a voltage vector position through a first Park transformation, wherein the pair of currents is determined by transforming a plurality of stator currents of the motor with a Clarke transformation; the voltage vector position is determined from an atan 2 function of a required β-axis voltage transformed to the two-phase stationary reference frame divided by the required α-axis voltage transformed into the two-phase stationary reference frame, wherein the required β-axis voltage is determined by an Inverse Park transformation of a required q-axis voltage with an electrical rotor position and the required α-axis voltage is determined by the Inverse Park transformation of a required d-axis voltage with the electrical rotor position, wherein the required q-axis voltage is determined by a q-axis PI controller configured to suppress to a zero value a q-axis error between a required q-axis current and a measured q-axis current and the required d-axis voltage is determined by a d-axis PI controller configured to suppress to the zero value a d-axis error between the required d-axis current and a measured d-axis current; and the required dv-axis current in the voltage vector reference frame is determined from the required power factor and from the pair of currents transformed into a rotational reference frame with a second Park transformation to generate a measured d-axis current and a measured q-axis current.

Alternative embodiments of the method for Field Oriented Control (FOC) of a motor with a constant Power Factor Control (PFC) Loop include one of the following features, or any combination thereof. The required dv-axis current in the voltage vector reference frame is further determined by multiplying a stator current of the motor with the required power factor phase shifted by a phase shift, wherein the stator current is determined from a square root of a sum of a square of each of the measured d-axis current and the measured q-axis current, wherein the measured d-axis current and the measured q-axis current are generated by transforming the pair of currents into the rotational reference frame with the electrical rotor position by a second Park transformation. A plurality of Pulse Width Modulation (PWM) channels are generated in a three-phase stationary reference frame from the required α-axis voltage and the required β-axis voltage in the two-phase stationary reference frame, wherein the plurality of PWM channels control a voltage source inverter to generate the plurality of stator voltages. The phase shift is positive pi/2. The phase shift is negative pi/2 and the multi-phase motor comprises an inductive load.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for Field Oriented Control (FOC) of a Permanent Magnet Synchronous Motor (PMSM) with a constant Power Factor Control (PFC) Loop comprising:
measuring a rotor position of the PMSM;
controlling a plurality of stator voltages of the PMSM with a required direct (d)-axis current, a required quadrature (q)-axis current, the rotor position and a plurality of measured stator currents of the PMSM in a three-phase stationary reference frame; and
determining the required d-axis current with a required power factor, the plurality of measured stator currents transformed into a two-phase stationary reference frame, the measured stator currents transformed into a rotational reference frame to generate a measured d-axis current and a measured q-axis current, and each of a required d-axis voltage and a required q-axis voltage transformed into the two-phase stationary reference frame, wherein the required d-axis voltage is determined with a d-axis Proportional Integral (PI) controller configured to suppress to a zero value a d-axis error between the required d-axis current and a measured d-axis current and the required q-axis voltage is determined with a q-axis PI controller configured to suppress to the zero value a q-axis error between the required q-axis current and a measured q-axis current, and wherein a power factor of the PMSM is controlled to be equal to the required power factor,
wherein the required d-axis current is determined with a dv-axis PI controller configured to suppress to the zero value a dv-axis error between a required dv-axis current and a measured dv-axis current.

2. The method of claim 1 further comprising generating the required q-axis current from a speed error, wherein the speed error is determined by subtracting a measured rotor speed of the PMSM from a required rotor speed.

3. The method of claim 1 further comprising adjusting a gain of the dv-axis PI controller with a d-axis inductance and a stator resistance of the PMSM.

4. The method of claim 1 further comprising transforming the measured stator currents into the two-stage stationary reference frame with a Clarke transformation, transforming the measured stator currents into the rotational reference frame with the rotor position through a first Park transformation, and transforming each of the required d-axis voltage and the required q-axis voltage into the two-phase stationary reference frame with the rotor position through an Inverse Park transformation.

5. A method for Field Oriented Control (FOC) of a Permanent Magnet Synchronous Motor (PMSM) with a constant Power Factor Control (PFC) Loop comprising:
measuring a rotor position of the PMSM;
controlling a plurality of stator voltages of the PMSM with a required direct (d)-axis current, a required quadrature (q)-axis current, the rotor position and a plurality of measured stator currents of the PMSM in a three-phase stationary reference frame; and
determining the required d-axis current with a required power factor, the plurality of measured stator currents transformed into a two-phase stationary reference frame, the measured stator currents transformed into a rotational reference frame to generate a measured d-axis current and a measured q-axis current, and each of a required d-axis voltage and a required q-axis voltage transformed into the two-phase stationary reference frame, wherein the required d-axis voltage is determined with a d-axis Proportional Integral (PI) controller configured to suppress to a zero value a d-axis error between the required d-axis current and a measured d-axis current and the required q-axis voltage is determined with a q-axis PI controller configured to suppress to the zero value a q-axis error between the required q-axis current and a measured q-axis current, and wherein a power factor of the PMSM is controlled to be equal to the required power factor,
wherein determining the required d-axis current further comprises determining a voltage vector position from an atan 2 function of the required β-axis voltage divided by the required a-axis voltage.

6. The method of claim 5 wherein determining the required d-axis current further comprises determining a measured direct voltage (dv)-axis current in a voltage vector reference frame by transforming the measured stator currents in the two-phase stationary reference frame with the voltage vector position through a second Park transformation.

7. The method of claim 6 wherein determining the required d-axis current further comprises suppressing to the zero value a dv-axis error between the measured dv-axis current in the voltage vector reference frame from a required dv-axis current in the voltage vector reference frame with a dv-axis PI controller.

8. The method of claim 7 wherein determining the required dv-axis current in the voltage vector reference frame further comprises multiplying a stator current of the PMSM with the required power factor phase shifted by positive pi/2, wherein the stator current is determined from a square root of a sum of a square of each of the measured d-axis current and the measure q-axis current.

9. The method of claim 7 wherein determining the required dv-axis current in the voltage vector reference frame further comprises multiplying a stator current of the PMSM with the required power factor phase shifted by negative pi/2, wherein the stator current is determined from a square root of a sum of a square of each of the measured d-axis current and the measure q-axis current.

10. A method for Field Oriented Control (FOC) of a Permanent Magnet Synchronous Motor (PMSM) with a constant Power Factor Control (PFC) Loop comprising:
determining a voltage vector position from an atan 2 function of a required β-axis voltage transformed into a two-phase stationary reference frame divided by a required a-axis voltage transformed into the two-phase stationary reference frame, wherein the required β-axis voltage is determined by an Inverse Park transformation of a required q-axis voltage with an electrical rotor position and the required α-axis voltage is determined by the Inverse Park transformation of a required d-axis voltage with the electrical rotor position, wherein the required q-axis voltage is determined by a q-axis Proportional Integral (PI) controller configured to suppress to a zero value a q-axis error between a required q-axis current and a measured q-axis current and the required d-axis voltage is determined by a d-axis PI controller configured to suppress to the zero value a d-axis error between a required d-axis current and a measured d-axis current;
transforming a pair of currents in the two-phase stationary reference frame with the voltage vector position with a first Park transformation to determine a measured direct voltage (dv)-axis current in a voltage vector reference frame, wherein the pair of currents in the two-phase stationary reference frame is determined by transforming a plurality of stator currents of the PMSM with a Clarke transformation;

determining a required dv-axis current in the voltage vector reference frame comprising multiplying a stator current of the PMSM with a required power factor phase shifted by a phase shift, wherein the stator current is determined from a square root of a sum of a square of each of the measured d-axis current and the measured q-axis current, wherein the measured d-axis current and the measure q-axis current are generated by transforming the pair of currents in the two-phase stationary reference frame into a rotational reference frame with the electrical rotor position of PMSM using a second Park transformation; and determining the required d-axis current by a dv-axis PI controller suppressing to the zero value a dv-axis error between the measured dv-axis current in the voltage vector reference frame and the required dv-axis current in the voltage vector reference frame.

11. The method of claim 10 further comprising generating the required q-axis current from a speed error, wherein the speed error is determined by subtracting the measured rotor speed of the PMSM from a required rotor speed.

12. The method of claim 10 further comprising adjusting a gain of the dv-axis PI controller determined by a d-axis inductance and a stator resistance of the PMSM.

13. The method of claim 10 wherein the phase shift is positive pi/2.

14. The method of claim 10 wherein the phase shift is negative pi/2.

15. A method for Field Oriented Control (FOC) of a motor with a constant Power Factor Control (PFC) Loop comprising:

using a dv-axis Proportional Integral (PI) controller to suppress to a zero value a dv-axis error between a measured dv-axis current in a voltage vector reference frame and a required dv-axis current in the voltage vector reference frame to determine a required d-axis current, wherein the required d-axis current controls a plurality of stator voltages of the motor to achieve a power factor defined by a required power factor, and wherein:

the measured dv-axis current in the voltage vector reference frame is determined by transforming a pair of currents in a two-phase stationary reference frame with a voltage vector position through a first Park transformation, wherein the pair of currents is determined by transforming a plurality of stator currents of the motor with a Clarke transformation;

the voltage vector position is determined from an atan 2 function of a required β-axis voltage transformed to the two-phase stationary reference frame divided by the required α-axis voltage transformed into the two-phase stationary reference frame, wherein the required β-axis voltage is determined by an Inverse Park transformation of a required q-axis voltage with an electrical rotor position and the required α-axis voltage is determined by the Inverse Park transformation of a required d-axis voltage with the electrical rotor position, wherein the required q-axis voltage is determined by a q-axis PI controller configured to suppress to a zero value a q-axis error between a required q-axis current and a measured q-axis current and the required d-axis voltage is determined by a d-axis PI controller configured to suppress to the zero value a d-axis error between the required d-axis current and a measured d-axis current; and the required dv-axis current in the voltage vector reference frame is determined from the required power factor and from the pair of currents transformed into a rotational reference frame with a second Park transformation to generate a measured d-axis current and a measured q-axis current.

16. The method of claim 15 wherein the required dv-axis current in the voltage vector reference frame is further determined by multiplying a stator current of the motor with the required power factor phase shifted by a phase shift, wherein the stator current is determined from a square root of a sum of a square of each of the measured d-axis current and the measured q-axis current, wherein the measured d-axis current and the measured q-axis current are generated by transforming the pair of currents into the rotational reference frame with the electrical rotor position by a second Park transformation.

17. The method of claim 15 further comprising generating a plurality of Pulse Width Modulation (PWM) channels in a three-phase stationary reference frame from the required α-axis voltage and the required β-axis voltage in the two-phase stationary reference frame, wherein the plurality of PWM channels control a voltage source inverter to generate the plurality of stator voltages.

18. The method of claim 15 wherein the phase shift is positive pi/2.

19. The method of claim 15 wherein the phase shift is negative pi/2 and the multi-phase motor comprises an inductive load.

* * * * *